United States Patent Office 3,068,214
Patented Dec. 11, 1962

3,068,214
QUATERNARY PHOSPHONIUM SALTS OF HALO-
GEN SUBSTITUTED VINYL AROMATIC ACRYL-
AMIDE COPOLYMERS
John H. Rassweiler, Greenwich, and David R. Sexsmith, Stamford, Conn., assignors to American Cyanamid Company, New York, N.Y., a corporation of Maine
No Drawing. Filed Dec. 1, 1959, Ser. No. 856,363
6 Claims. (Cl. 260—87.5)

This invention relates to water-soluble copolymers containing quaternary phosphonium salt groups. More particularly, this invention is directed to novel aqueous-soluble copolymeric compositions obtained by reacting a copolymer of ar-substituted haloalkyl styrenes and an acrylamido monomer with certain tri-substituted phosphines.

The linear chain copolymers of the invention are thermoplastic resinous polymerization products consisting essentially of two different types of monomers. The first or hydrophobic type, which is preferably employed in minor amounts, i.e., less than 50% by weight, is a mono-ethylenically unsaturated monomer containing a $CH_2=C<$ or vinyl group having attached thereto an aromatic hydrophobic substituent capable of imparting water repellency to hydrophilic surfaces. The hydrophobic substituents consist more specifically of an aromatic ring containing thereon, as an essential part, a halogenated alkyl radical. The monomers of the second type, the acrylamido monomers, are also monoethylenically unsaturated compounds capable of copolymerizing with those of the first type through a $CH_2=C<$ group but are, as distinguished from the first type, essentially hydrophilic. The invention is particularly concerned with the advantages afforded by subsequent treatment, with a tri-substituted phosphine, of the copolymerization product of these two specific types of monomers, but it will be understood that other copolymerizable compounds hereinafter described more fully may also be present in minor amounts up to about 15% of the weight of the copolymer in some cases.

A variety of organic copolymers containing one or more hydrophobic groups may be used. Typical among this first type of monomers are polymerizable compounds represented by the formula

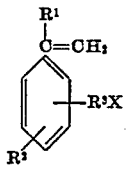

wherein $R^1$ and $R^2$ are substituents selected from the group consisting of hydrogen, halogen, methyl and ethyl radicals, $R^3$ is a substituent selected from the group consisting of methylene and ethylene radicals, and X is a halogen atom. Examples of this type of compound are such as ar-(chloromethyl)styrene, ar-(1-chloroethyl)styrene, ar-(bromomethyl)styrene, ar-(1-bromoethyl)styrene, p-chloro-ar-(chloromethyl)styrene, ar-methyl-ar-bromomethylstyrene, ar-ethyl-ar-chloromethylstyrene, ar-methyl-ar-chloromethylstyrene, p-chloro-ar-(1-chloroethyl)styrene, α-methyl ar(1-chloroethyl)styrene, p-bromo-ar(chloromethyl)styrene, α-methyl-ar(chloromethyl)styrene, and the like.

Examples of the acrylamido, or second type compounds which are employed in the preparation of copolymers with which the invention is specifically concerned are compounds of the general formula

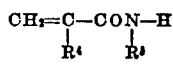

wherein $R^4$ is a substituent selected from the group consisting of hydrogen, halogen and methyl radicals and $R^5$ is a substituent selected from the group consisting of hydrogen and alkyl radicals of 1-20 carbon atoms. Suitable compounds of this type are such as acrylamide, methacrylamide, α-chloroacrylamide, α-bromoacrylamide, and the N-substituted alkyl derivatives such as N-methyl acrylamide, N-ethylacrylamide, N-propylacrylamide, N-t-butylacrylamide, N-dodecylacrylamide, and the like.

The relative mole ratios of the copolymerizable components may vary from about 1 to 95 mole percent of the vinyl aromatic monomers and from about 99 to about 5 mole percent of the acrylamido monomers and preferably a mole ratio of vinyl aromatic to acrylamido monomer in the range of 1:99 to about 40:60, respectively.

It is understood that within the scope of the invention, mixtures or blends of the monomers of the first type may be copolymerized with mixtures or blends of monomers of the second type.

As stated, it may be desirable to modify these copolymers by the addition of up to about 15% of a third and different polymerizable monomer during the copolymerization reaction. Suitable compounds are the polymerizable monomers containing a $CH_2=C<$ group. Exemplary of such monomers are vinyl chloride and vinylidene chloride; the vinyl esters, such as vinyl acetate, ethyl acrylate, ethyl methacrylate, methyl methacrylate, etc. and conjugated diolefins, such as butadiene, isoprene, chloroprene, 2,3-dimethyl butadiene, and the like.

The optimum proportions of the copolymerizable compound depend on the particular application. It will be apparent that the copolymer, prior to conversion of the haloalkyl groups on the aromatic ring, is soluble where it contains a proportion, i.e., about 60% or more, of the water-soluble acrylamido compound to offset the hydrophobic character of the vinyl aromatic component. Where the copolymer is insoluble in water, the formation of the quaternary phosphonium salt effects water solubility. In either case, the product is water soluble; the reaction of the copolymer with the phosphine compound converts the non-ionic nature of the copolymer to a novel product which is cationic and substantive to cellulose. When the resin is so conditioned it is selectively adsorbed or absorbed by the cellulose fibers from a dilute aqueous solution or dispersion thereof, containing these fibers, in amounts much greater than those corresponding to the concentration of resin in the solution or to what would be contained in the water normally left in the sheet after forming.

The copolymerization of the vinyl aromatic compound containing the alkyl halogen radical and the acrylamido compound can be effected by any of the procedures known to be suitable for polymerizing vinyl compounds. Thus thermal or ultraviolet light polymerization may be employed. Preferably a small quantity, on the order of 0.1% to 2% on the weight of the monomers, of a suitable polymerization initiator, such as azobisisobutyronitrile, benzoyl peroxide, cumene hydroperoxide, pinane hydroperoxide, and the like, is added, after which the reaction mixture is heated at temperatures of about 50° C. to 150° C. until the copolymerization has been carried to the desired extent. Bulk polymerization procedures may be used in which the reagents are simply heated together in a closed vessel, or the polymerization can be carried out in an organic solvent, such as dioxane, toluene, or other aromatic hydrocarbon solvent known in the art to be suitable for this purpose.

The presence of water-soluble material in the aqueous solution of the salts of the copolymers is not excluded. For example, cooked starch may be employed to further enhance the properties which are imparted by the resin without losing any advantages afforded by the copolymers of the invention.

Suitable tri-substituted phosphines which may be utilized in preparing the phosphonium quaternary salt on the ar-haloalkyl radical on the styrene units in the copolymer are those of the formula

wherein $R^6$, $R^7$ and $R^8$ are substituents selected from the group consisting of alkyl radicals of 1–6 carbon atoms, cyanoethyl radicals, aryl radicals, alk-aryl radicals and aralkyl radicals. Illustrative compounds of this type are such as trimethylphosphine, triethylphosphine, tripropylphosphine, tributylphosphine, tricyanoethylphosphine, tripentylphosphine, diethylmethylphosphine, dibutylethylphosphine, dipropylmethylphosphine, dicyanoethylmethylphosphine, triphenylphosphine, phenyldicyanoethylphosphine, benzyldicyanoethylphosphine, tolyl dicyanoethylphosphine, benzyldiethylphosphine, tolyl diethylphosphine, and the like.

In preparing the quaternary phosphonium salt, the phosphine compound, preferably in excess of an equal molar ratio, based on the amount of ar-haloalkyl substituted styrene, is employed although generally amounts even less than equal molar quantity of the phosphine may be sufficient. In general, quantities of the phosphine compound to ar-haloalkyl substituted styrene in the copolymer in a molar ratio of from about 0.8:1 to about 2.0:1, respectively, may be used. Larger relative quantities of the phosphine may be used but no advantage accrues thereby.

The temperature employed in the quaternizing reaction may vary from about room temperature to reflux. It is preferred that temperatures in the range of from about 40° C. to about 80° C. be employed.

The quaternary phosphonium salt prepared from the copolymer according to the invention may be represented by the general formula

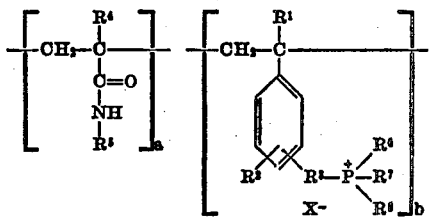

wherein $R^1$ through $R^8$ and X have the values hereinabove defined and the mole ratio of a to b is from about 99:1 to about 5:95, respectively.

From a practical standpoint, it is sometimes desirable to dissolve the polymer salt in a mixture of a water and water-miscible solvent before adding additional water to dilute the mixture further. The addition of small amounts, i.e., generally of water-miscible organic solvent, does not interfere with the use of those copolymers and frequently improves solubility in water. Frequently by adding these small amounts of solvents, the copolymers of the invention are rendered more soluble and useful than would be the case if the water-miscible organic solvent were omitted. Water-miscible organic solvents for this purpose are such as dioxane, dimethyl formamide, butyl cellusolve, ethyl cellusolve, or various water-miscible alcohols and ketones.

The molecular weights of the copolymers are not critically important, inasmuch as water-soluble products are obtainable over a wide range of molecular weights. The more useful properties are obtained when the copolymers have attained molecular weights of at least about 10,000 although it will be understood that the resins produced by the above-described processes ordinarily have molecular weights substantially higher than this minimum and usually within the range of about 50,000 to 800,000 and even higher.

It will be seen, therefore, that the linear carbon chain polymers used in practicing the invention are cationic quaternary salts of (a) polymerizable ar-substituted vinyl aromatic, which substituents are halogenated alkyl radicals of 1 to 2 carbon atoms, and (b) acrylamido monomers copolymerizable with (a). All or part of the halogens in the vinyl aromatic alkyl group in the straight chain copolymer are converted to salt groups by reacting the copolymers with (c) an organic tri-substituted phosphine of the general formula hereinbefore described.

Because of their water solubility, these resinous phosphonium salts can be economically applied to surfaces. They have been found to confer unusual dry strength and flame resistant properties to paper substrates to which they have been applied. In addition to their use with cellulosic bodies, the resins may be applied to various substrates, e.g., to textiles and to glass and metal surfaces, to improve the surface characteristics of, or serve as protective films for, these materials.

In order that the present invention may be more fully understood, the following examples are set forth for purposes of illustration only, and any specific enumeration of details should not be interpreted as a limitation, except as expressed in the appended claims. Parts expressed are parts by weight, unless otherwise stated.

*Example 1*

32 parts of acrylamide and 7.6 parts of chloromethylstyrene were brought to reflux in 200 parts of acetone and treated with 1.45 parts of benzoyl peroxide. After refluxing for 3 hours, the precipitated polymer was collected by filtration and air dried. 10 parts of the copolymeric product is dissolved in 150 parts of water and treated with 3.03 parts of tributylphosphine. The coreactants are flash-flushed with nitrogen and heated at 60° C. for 6 hours to produce the water-soluble quaternary salt of the copolymer. The product is composed of recurring units of the formula

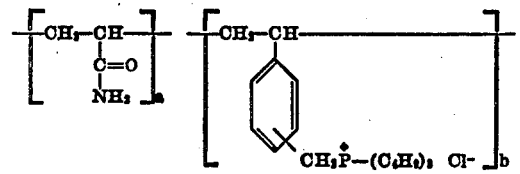

in a ratio of a to b of about 9:1.

*Example 2*

38.7 parts of methacrylamide and 7.6 parts of chloromethylstyrene are copolymerized as in Example 1. The copolymeric product is then quaternized with 3.5 parts of diethylmethylphosphine. The product is fully water soluble.

*Example 3*

32 parts of acrylamide and 7.6 parts of chloromethylstyrene are copolymerized as in Example 1. Quaternization of the copolymeric product is conducted with 2.5 parts of triethylphosphine.

*Example 4*

28.4 parts of acrylamide and 15.2 parts of bromomethylstyrene are copolymerized as described in Example 1. The product is then quaternized with 6.06 parts of tributylphosphine.

*Example 5*

28.4 parts of N-tert. butyl acrylamide and 15.2 parts of chloromethylstyrene are copolymerized as in Example 1 and then the polymeric product is quaternized with 2.53 parts of tributylphosphine.

Example 6

21.3 parts of dodecyl acrylamide, 15.2 parts of chloromethylstyrene and 8.88 parts of methyl acrylate are copolymerized with 1.2 parts of azobisisobutyronitrile. The product is quaternized with 6.06 parts of tributyl phosphine.

Example 7

10 parts of the copolymer prepared according to Example 1 are dissolved in water and reacted with phenyl dicyanoethyl phosphine. The resulting phosphonium salt has the formula

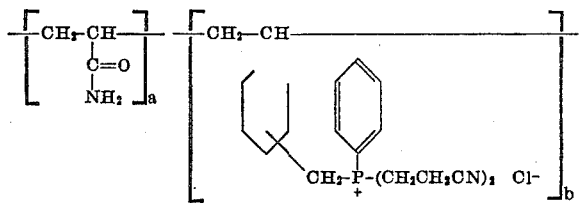

A positive hydrogen ion test with silver nitrate was obtained with each of the products of Examples 1 to 7.

The cationic products prepared according to the invention may be usefully applied as emulsifiers, detergents, to aid in the separation of ores, to paper, and as corrosion inhibitors in metal plating baths, for example. When applied to paper as a dry strength additive a solution of the quaternary phosphonium product preferably in a concentration to provide about 1% polymer solids by weight based on the dry weight of the pulp is used.

The phosphonium salt copolymeric products obtained in Examples 1 to 7 are excellent soil conditioners. When applied to soil for this purpose, i.e., to improve the tilth of the soil, aqueous solutions varying in polymer concentrations of from about 0.2 to about 2.0% polymer by weight of the solution are used to drench the loose soil.

The quaternary phosphonium salts of the invention, used to treat textiles in aqueous solutions, are electrochemically absorbed on the fibers conferring flame proofing and softness to the fabric.

We claim:

1. A water-soluble, linear chain, cationic, resinous composition consisting essentially of the quaternary phosphonium salt of a copolymer of (a) from about 1 to about 95 mole percent of a compound of the general formula

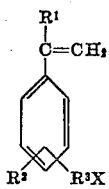

wherein $R^1$ and $R^2$ are substituents selected from the group consisting of hydrogen, chlorine, bromine, iodine methyl and ethyl radicals, $R^3$ is a substituent selected from the group consisting of methylene and ethylene radicals, and X is selected from the group consisting of chlorine, bromine and iodine atoms, and (b) from about 5 to about 99 mole percent of an acrylamido compound with a phosphine selected from the group consisting of compounds of the formula

wherein $R^6$, $R^7$ and $R^8$ are substituents selected from the group consisting of alkyl radicals of 1 to 6 carbon atoms, inclusive, cyanoethyl radicals, aryl radicals, alkaryl radicals and aralkyl radicals, said phosphine replacing said X and being attached to the copolymer on the $R^3$ substituent.

2. A water-soluble, linear chain, cationic, resinous composition consisting essentially of the quaternary phosphonium salt of a copolymer of (a) from about 1 to about 95 mole percent of a compound of the general formula

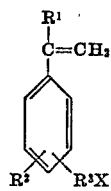

wherein $R^1$ and $R^2$ are substituents selected from the group consisting of hydrogen, chlorine, bromine, iodine methyl and ethyl radicals, $R^3$ is a substituent selected from the group consisting of methylene and ethylene radicals, and X is selected from the group consisting of chlorine, bromine and iodine atoms, and (b) from about 5 to about 99 mole percent of acrylamide with a phosphine selected from the group consisting of compounds of the formula

wherein $R^6$, $R^7$ and $R^8$ are substituents selected from the group consisting of alkyl radicals of 1 to 6 carbon atoms, inclusive, cyanoethyl radicals, aryl radicals, alkaryl radicals and aralkyl radicals, said phosphine replacing said X and being attached to the copolymer on the $R^3$ substituent.

3. A water-soluble, linear chain, cationic, resinous composition consisting essentially of the quaternary phosphonium salt of a copolymer of (a) from about 1 to about 95 mole percent of ar-(chloromethyl) styrene (b) from about 5 to about 99 mole percent of acrylamide and (c) up to about 15 mole percent of methyl acrylate, with a phosphine selected from the group consisting of compounds of the formula

wherein $R^6$, $R^7$ and $R^8$ are substituents selected from the group consisting of alkyl radicals of 1 to 6 carbon atoms, inclusive, cyanoethyl radicals, aryl radicals, alkaryl radicals, and aralkyl radicals, said phosphine replacing the chloro atom of said ar-(chloromethyl)styrene and being attached to the copolymer on the methyl substituent of said styrene.

4. A water-soluble, copolymeric composition consisting essentially of only recurring units of the formula

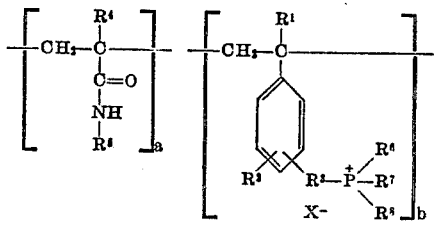

wherein $R^1$ and $^2$ are substituents selected from the group consisting of hydrogen, chlorine, bromine, iodine methyl and ethyl radicals, $R^3$ is a substituent selected from the group consisting of methylene and ethylene radicals, $R^4$ is a substituent selected from the group consisting of hydrogen, chlorine, bromine, iodine and methyl radicals, $R^5$ is a substituent selected from the group consisting of hydrogen and an alkyl radical of 1 to 20 carbon atoms, inclusive, $R^6$, $R^7$ and $R^8$ are substituents selected from the group consisting of alkyl radicals of 1 to 6 carbon atoms, inclusive, cyanoethyl radicals, aryl radicals, alkaryl radicals and aralkyl radicals, and X is selected from the group consisting of chlorine, bromine and iodine atoms, and the mole ratio of a to b is from about 99:1 to about 5:95, respectively.

5. A water-soluble, copolymeric composition consisting essentially of only recurring units of the formula

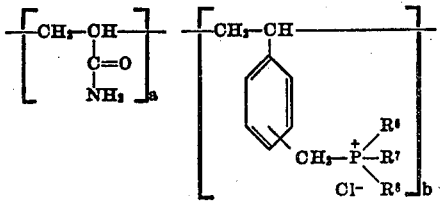

wherein $R^6$, $R^7$ and $R^8$ are substituents selected from the group consisting of alkyl radicals of 1 to 6 carbon atoms, inclusive, cyanoethyl radicals, aryl radicals, alkaryl radicals and aralkyl radicals, and the mole ratio of $a$ to $b$ is from about 99:1 to about 5:95, respectively.

6. A water-soluble, copolymeric composition consisting essentially of only recurring units of the formula

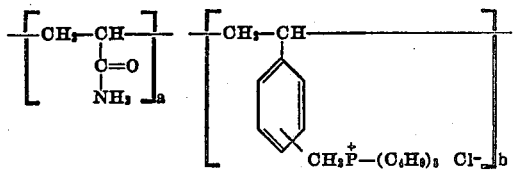

wherein the mole ratio of $a$ to $b$ is from about 99:1 to about 5:95 respectively.

References Cited in the file of this patent

UNITED STATES PATENTS

| | | |
|---|---|---|
| 2,764,560 | McMaster et al. | Sept. 25, 1956 |
| 2,780,604 | Clarke et al. | Feb. 5, 1957 |
| 2,937,207 | Reuter et al. | May 17, 1960 |

FOREIGN PATENTS

| | | |
|---|---|---|
| 726,936 | Great Britain | Mar. 23, 1955 |

OTHER REFERENCES

Jones et al: Journal of Polymer Sci., pp. 201–15 (pages 206–11 and 214 relied on), 25, (1957).

Kosolapoff: Organophosphorus Compounds, pages 78–79 (1950), John Wiley and Sons, Inc., New York.

UNITED STATES PATENT OFFICE
CERTIFICATE OF CORRECTION

Patent No. 3,068,214　　　　　　　　　　　　December 11, 1962

John H. Rassweiler et al.

It is hereby certified that error appears in the above numbered patent requiring correction and that the said Letters Patent should read as corrected below.

Column 5, lines 12 to 21, Example 7, the formula should appear as shown below instead of as in the patent:

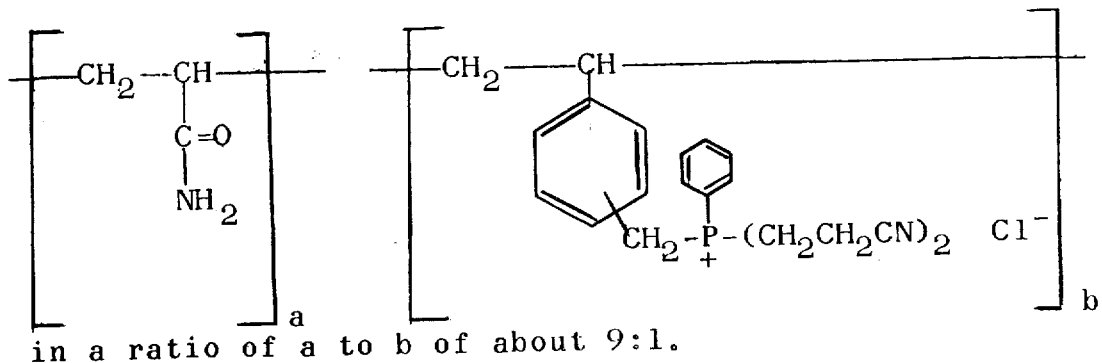

in a ratio of a to b of about 9:1.

Signed and sealed this 21st day of May 1963.

(SEAL)
Attest:
ERNEST W. SWIDER
Attesting Officer

DAVID L. LADD
Commissioner of Patents